3,041,046
Patented June 26, 1962

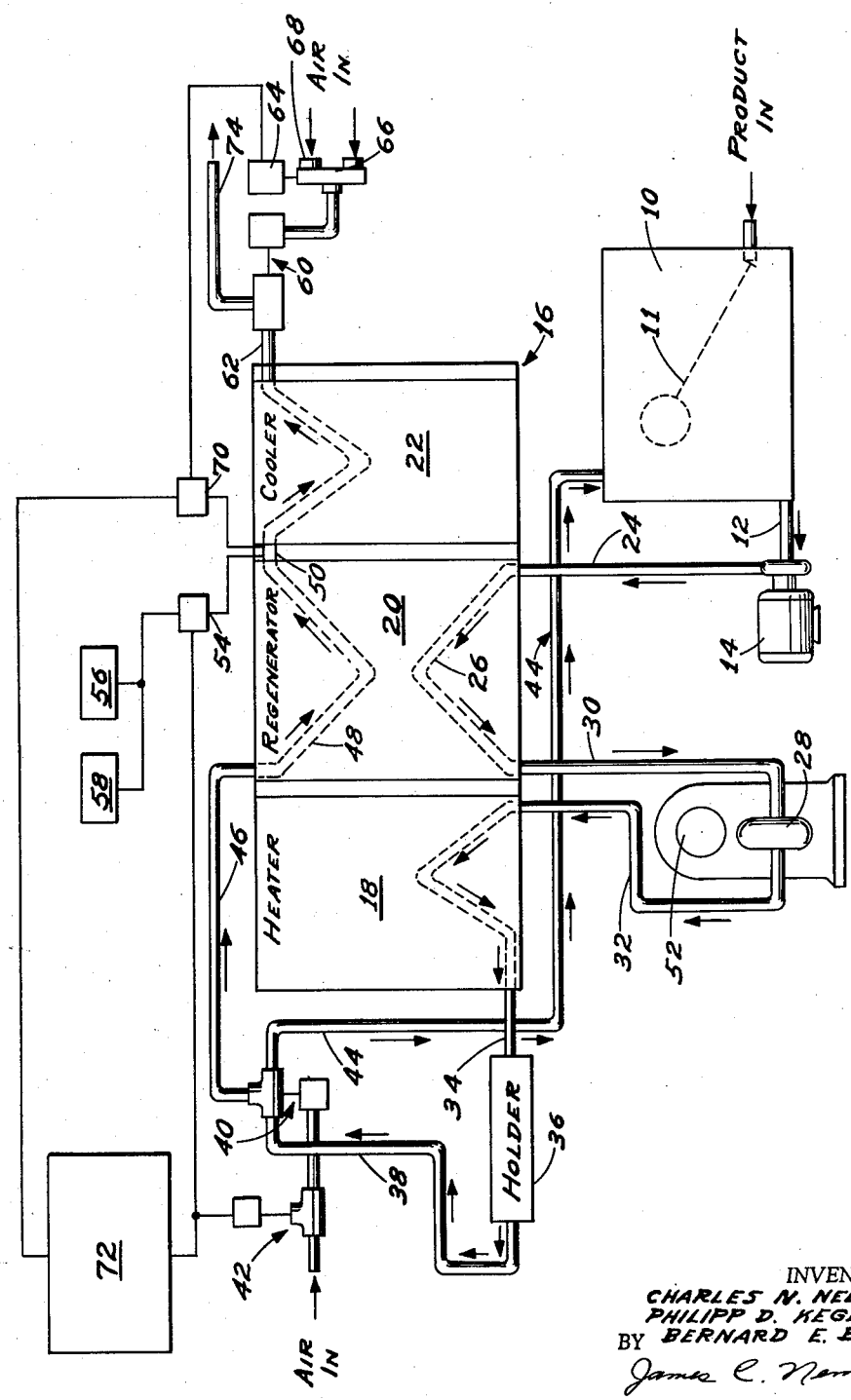

3,041,046
HEAT TRANSFER APPARATUS
Charles N. Nellis, Jr., Little Falls, Philipp D. Kegel, Mohawk, and Bernard E. Black, Little Falls, N.Y., assignors to Cherry-Burrell Corporation, Cedar Rapids, Iowa, a corporation of Delaware
Filed Dec. 12, 1958, Ser. No. 780,043
6 Claims. (Cl. 257—292)

This invention relates to plate-type heat transfer apparatus and more particularly to such apparatus employing a regenerator section in which a cold untreated product is preheated through utilization of excess heat in the treated product by circulating treated product through such regenerator section.

Separable plate heat exchangers of the type to which our invention relates are commonly employed in continuous pasteurizing systems for liquid comestibles such as milk. Our invention will be described in connection with a milk pasteurizing system but it should be understood that it is not limited thereto. Plate-type heat exchangers used in such systems generally consist of three separate groups of plates with terminal blocks therebetween to form a heater, a regenerator section, and a cooler section. In addition, a "holding" tube is usually provided in which heated milk is held at pasteurizing temperature for a predetermined amount of time.

In a system of this type, the cold, unpasteurized milk enters the regenerator section at the end adjacent the cooler section, passes through alternate spaces between plates of the regenerator section, and emerges adjacent the heater section. The heated milk enters the regenerator section adjacent the heater section and passes through the spaces intervening between those through which incoming cold milk is passed.

The successive plates in this type of heat exchanger are, of course, spaced apart by suitable gaskets of resilient material such as neoprene. The gaskets are arranged to provide flow passages which channel the milk through predetermined flow paths. Notwithstanding the pressure under which the plates are held in operating relation, it is conceivable that milk circulating under pressure through an apparatus of this type could leak past the gaskets in some places.

To prevent the possibility of contaminating the heated milk, it is imperative practically and generally required legally, that the heated milk be under greater pressure in the regenerator section than the pressure on the incoming unpasteurized milk.

During certain phases of the operation of this type pasteurizing apparatus, i.e., when the milk is in "diverted flow," no heated milk is circulated through the regenerator section and therefore, the pressure in this flow passage is atmospheric. In order to prevent possible contamination of the spaces through which the heated milk is to pass in the event some leakage should develop along the flow path of the cold milk through the regenerator, the pressure on the incoming cold milk must be less than atmospheric pressure.

In the present state of the art, pressure is maintained at less than atmosphere in the cold milk passages or so-called "untreated side" of the regenerator section by pulling the product therethrough with a pump and so designing the flow pattern of the untreated side that the pressure developed therein does not exceed the point at which the milk at regenerator temperature will vaporize. However, the trend is to greater heat exchanger capacities and higher product temperatures which require more complex flow patterns with a resulting increase in cost. Moreover, at higher capacities, higher regeneration efficiencies become increasingly desirable. Formerly 70 to 80 percent efficiencies were acceptable, but now 85 percent and better are commonly desired. In order to meet these requirements and still maintain the suction on the pump within usable limits, it has been necessary in conventional systems to use approximately twice the number of regenerator plates that would normally be required for 75 to 80 percent regenerator efficiencies.

It is therefore a principal object of this invention to provide a heat transfer apparatus that conforms with legal requirements and is of high efficiency and high overall capacity without substantially increasing the size of the regenerator unit.

A further object of this invention is to permit pressures below atmosphere to be applied on the untreated side of the regenerator when the product is in diverted flow (and therefore not flowing on the treated side of the regenerator), and in the same system to permit the use of pressures higher than atmospheric on the untreated side of the regenerator when the product is flowing through the treated side—while automatically maintaining at all times a higher pressure on the treated side.

Another object of this invention is to permit the use of higher pressures and thus greater velocities in each flow passage, thereby increasing the heat exchange efficiency of the individual plates of the regenerator.

Concurrently with all of the above objects, it is still another object of our invention to provide an automatically controlled pasteurizing system of higher efficiency than those conventionally employed by the addition of a few relatively inexpensive and easily installed components to a conventional system, thus providing an improved system that conforms to all legal requirements.

Other objects and features of the invention will appear from the following detailed description taken in connection with the accompanying drawing which is a diagrammatic view showing a pasteurization system incorporating our invention.

Referring to the drawing, the raw untreated milk or other dairy product from a supply source (not shown) is introduced into a tank 10, the milk preferably being maintained at a constant level by means of a float valve 11. The milk flows from the tank 10 through pipe 12 into pressure generating means, such as booster pump 14 which may be of the centrifugal type. A plate-type heat exchanger, designated generally by reference numeral 16 and preferably of the general type shown in Newhall Patent No. 2,639,126, consists of three sections, a heater 18, a regenerator 20, and a cooler 22.

The milk flows from the pump 14 through pipe 24 into the regenerator 20, passing through alternate spaces which form the untreated side or flow path of the regenerator. Flow through the untreated side of the regenerator is indicated diagrammatically by the broken line 26. As will be seen more clearly later, the milk is pulled through the untreated side by suction provided from flow generating means, such as positive displacement pump 28, connected by pipes 30 and 32 between the regenerator 20 and the heater 18. The milk is then delivered through heater 18, and thereafter through pipe 34 to a holder 36. The purpose of this holder 36 is to maintain the milk at its then attained temperature for a predetermined amount of time. In a preferred form, the holder 36 is an elongated tube, the length of which is determined by rate of flow of the milk and the time during which the attained temperature is to be maintained.

If the milk flowing from the holder 36 through pipe 38 is not at the required temperature, a control means comprising a flow diverting device or valve 40 actuated by a temperature responsive solenoid air valve 42 will divert the milk flow into a return line 44 to the tank 10 for reprocessing. The Taylor Instrument Companies of Rochester, New York, manufacture a flow diversion valve 39VJ2 that will adequately perform the functions required of valve 40. If the milk is at the required preset temperature, valve 40 will direct the milk flow through line 46 into the treated side of the regenerator 20. Flow through the treated side is through alternate spaces between plates of the regenerator 20 and is indicated diagrammatically by broken line 48.

The hot treated milk flowing through side 48 of the regenerator will preheat the cold untreated milk flowing through the other side 26. The milk then flows from the treated side 48 of the regenerator through pipe 50 to the cooler 22 which is maintained at predetermined temperature by circulating a suitable cooling medium therethrough.

In order to accomplish the objects of our invention, we provide in the system just described the booster pump 14, which is located between the tank 10 and the untreated side 26 of the regenerator 20, and also add to the system means for variably controlling the milk flow, which may include a motor-driven speed changer 52 operatively connected to the pump 28.

We further provide a pressure switch 54 that is responsive to pressure in pipe 50 for completing or interrupting the electrical circuit for the booster pump starter 56. When the booster pump 14 starts, the starter 58 of the speed changer 52 is also actuated. The starters 56 and 58 can be of any standard commercial type, and when actuated start operation of pump 14 and speed changer 52, which in turn increases the speed of pump 28. We prefer to provide the speed changer 52 with limit switches (not shown) so that pump 28 will operate only between two predetermined speeds, stabilizing itself at one or the other, depending on the position of the pressure switch 54. The amount of pressure in pipe 50 that is necessary to close switch 54 is greater than the maximum pressure developed by the booster pump 14. Thus, the booster pump 14 can never develop a pressure on the milk in the untreated side of the regenerator that is greater than the milk pressure in the treated side.

We also provide a pressure regulator 60 in the discharge line 62 of the cooler 22. This regulator may be pneumatically, electrically or hydraulically controlled to variably restrict the milk discharge flow and thereby vary the pressure in the system. We prefer to construct the regulator 60 as an air operated variable orifice valve. A suitable valve of this type is manufactured by Food Equipment and Specialties Company of Wilmette, Illinois, and is shown in their Bulletin 356. A solenoid 64 controls the admission of air to the regulator 60 through either valve 66 or 68, which supply air at different predetermined pressures. When the solenoid 64 is energized, air will be supplied through valve 66 to slightly open the orifice of regulator 60 but the flow therethrough will be greatly restricted. When the solenoid is de-energized, valve 68 will supply lower air pressure to regulator 60, thereby further opening the orifice and increasing the flow; however, the flow will still be restricted. The solenoid 64 becomes de-energized when a second pressure switch 70 closes in response to a rise in pressure in pipe 50 to some pressure greater than the pressure required to close switch 54. The settings of the two switches 54 and 70 are dictated by the particular installation, and the difference in their settings is such as to maintain the pressure on the milk at a level that will sustain operation of the pump 14.

The entire system is controlled centrally from a control panel 72 which, in turn, is supplied by a source of electrical power (not shown). The Taylor Instrument Companies of Rochester, New York, manufacture an HTST controller that is suitable for this purpose.

Prior to starting up the system, the milk temperature will be relatively low so that the valve 40 will be in "divert" position. Also, the pressure at the inlet to the cooler 22 will be low and, therefore, the switches 54 and 70 will be open. When power is supplied to the system, pump 28 starts at slow speed and pulls the milk through the untreated side 26 of the regenerator 20 at a rate of flow sufficient low to maintain the milk pressure at the suction side of the pump below the vaporization point. The untreated milk is then pushed through the heater 18 and holder 36 and to the valve 40. If the milk temperature is not up to the required level, the valve 40 will remain in "divert" position and the milk will be returned through line 44 to the tank 10 for reprocessing.

When the milk temperature reaches the required level, the solenoid air valve 42 will be actuated thereby and will supply air pressure to the valve 40 to move it into "forward" flow position, thereby directing the milk flow through pipeline 46 and into the treated side 48 of the regenerator. At this time the orifice of the pressure regulator 60 is greatly restricting the flow to the system outlet 74 since the pressure switch 70 is open and the solenoid 64 energized, thereby causing air pressure to be supplied to the regulator 60 through valve 66.

Since the milk is being pumped through the system by pump 28 and the outlet 74 is greatly restricted by regulator 60, pressure in the system will increase rapidly. When the pressure reaches the preset value of switch 54, the switch closes and the booster pump starter 56 is actuated, starting the booster pump 14. Simultaneously with the starting of the booster pump 14, the speed changer starter 58 is actuated, thereby increasing the speed of pump 28. Since the pressure regulator 60 continues to greatly restrict the product flow out of the system, the pressure continues to rise until the switch 70 closes, thus de-energizing the solenoid 64 which causes air pressure to be supplied through valve 68 to the regulator 60, thereby producing less restricted milk flow to the output 74. When the switch 70 closes, a latch-in relay coil (not shown) is energized which opens a normally closed relay in the circuit of solenoid 64. The relay is mechanically locked and thus the solenoid 64 will remain de-energized regardless of the position of switch 70. Regulator 60 will therefore remain in the less restricted position until latch is released and the solenoid 64 energized. The relay is electrically reset when the milk pressure drops a sufficient amount to open the switch 54. With the booster pump 14 running and pump 28 operating at full speed, the system is in operation for high capacity production.

If the milk temperature remains above the required level, the system will remain in high capacity operation with the regulator 60 in the less restricted position and the pressure on the treated side greater than the pressure on the untreated side. Note that during this time the switch 70 may be either open or closed according to the milk pressure, which may be either above or below the pressure setting of switch 70 depending upon the setting of regulator 60.

In case of a drop in milk temperature below the preset control point, valve 40 will move to the "divert" position directing the milk flow into return line 44. Since the product is no longer flowing through the treated side 48 of the regenerator, the pressure immediately drops in line 50, opening pressure switch 54, which stops the booster pump 14 and returns the pump 28 to slow speed, low capacity operation. Also, opening of the switch 54 resets the latch-in relay to energize solenoid 64 and supply air through valve 66 to regulator 60, which then goes to the greatly restricted position. When the milk temperature again rises above the preset level, the above described sequence of operations is repeated.

It should be noted that when the system is placed in initial operation with the valve 40 in "divert" position, the pressure in the untreated side 26 of the regenerator is less than atmospheric pressure because the booster pump 14 is not running and the pump 28 is pulling the milk through side 26. The pressure on the treated side 48 of the regenerator is at atmospheric pressure, there being nothing flowing therethrough, and is therefore greater than the pressure on side 26. Also, at this stage of operation the pump 28 is running at slow speed to keep the milk pressure below that at which the product would vaporize.

With the system running at full capacity, i.e., the pump 28 running at high speed and the booster pump 14 running, the pressure on the treated side 48 will always be greater than the pressure on the untreated side 26 of the regenerator because the switch 54 is set to open (and stop the booster pump) at a pressure higher than the maximum pressure developed by the booster pump. We have therefore eliminated any possibility of contamination of the treated or pasteurized milk by the untreated milk should a leak occur in the regenerator plates separating them.

Having thus described our invention, and although it has been illustrated with certain specific structures, it will be apparent to those skilled in the art that the principles of the invention are broad in scope and are capable of general application to liquids processed through heat exchangers where it is desirable to dissipate heat in one liquid to attemper that in another. It is therefore our intention that such revisions and variations of the invention are as reasonably expected on the part of those skilled in the art will be included within the scope of the following claims.

We claim:

1. In a system of the class described, the combination of a heat exchanger having a regenerator section with first and second flow paths therethrough, a pressure generator preceding said first flow path, a variable rate circulator interposed between said flow paths, and a variable flow restricter following said second flow path, all connected in series by suitable duct means, first pressure responsive means disposed in said duct means between the second flow path and the flow restricter and connected with said pressure generator, and said circulator in a manner to actuate the former and to increase the flow from the latter when a first predetermined liquid pressure is developed between the second flow path and the flow restricter, and second pressure responsive means disposed in said duct means between the second flow path and the flow restricter and operatively connected with said flow restricter to operate same when a second predetermined liquid pressure is developed in said duct means between said second flow path and the flow restricter.

2. In a system of the class described, the combination of a constant level supply tank, a regenerator connected downstream from said tank and, having a first liquid flow path therethrough connected in series with a second liquid flow path therethrough, a heater and a first pump disposed between and connected in series with said flow paths, said pump serving to pull fluid from said supply tank through said first flow path and push fluid through said heater, a temperature responsive valve interposed between said heater and said second flow path and a duct from said valve to the supply tank, said valve being set to return fluid to the supply tank when it is below a predetermined temperature, a cooler at the discharge end of said second flow path for lowering the temperature of the fluid flowing therefrom, a variable orifice valve at the cooler outlet to regulate the fluid pressure in said cooler and second flow path, a speed changer operatively connected to said first pump, a booster pump interposed between said supply tank and first flow path, a first pressure responsive device located between said second flow path and said cooler and connected to said booster pump and speed changer in a manner to start said booster pump and increase the speed of said first pump when a predetermined pressure is attained, said predetermined pressure being greater than the maximum pressure developed by said booster pump, and a second pressure responsive device located between said second flow path and said cooler, said second device being responsive to a higher pressure than said first device and operatively connected to said variable orifice valve to control the same.

3. In a heat transfer apparatus of the class described in which a cold untreated liquid is heated through a heat exchange wall by a hot treated liquid flowing on the opposite side of said wall, the combination of a flow generator, a pressure generator for increasing the pressure of the untreated liquid in said heat transfer apparatus, liquid transmission means interconnecting said pressure generator, flow generator, and the opposite sides of said heat exchange wall in series flow relationship, means for regulating the pressure of the treated liquid in said heat transfer apparatus, means responsive to a predetermined amount of pressure of the treated liquid for placing in operation said pressure generator and increasing the output of said flow generator, and means responsive to a predetermined higher pressure of the treated liquid for controlling said pressure regulating means.

4. In a heat transfer apparatus of the class described in which a cold untreated liquid is heated through a heat exchange wall by a hot treated liquid flowing on the opposite side of said wall, the combination of a flow generator, a pressure generator for increasing the pressure of the untreated liquid in said heat transfer apparatus, liquid transmission means interconnecting said pressure generator, flow generator, and the opposite sides of said heat exchange wall in series flow relationship, means for regulating the pressure of the treated liquid in said heat transfer apparatus, means responsive to a first predetermined pressure of the treated liquid for placing in operation said pressure generator and increasing the output of said flow generator, and means responsive to a second predetermined liquid pressure higher than said first pressure for controlling said pressure regulating means to prevent the pressure of the treated liquid from increasing above a third predetermined pressure while maintaining the treated liquid pressure at a level that will sustain operation of said pressure generator.

5. In a heat transfer apparatus of the class described in which a cold untreated liquid is heated through a heat exchange wall by a hot treated liquid flowing on the opposite side of said wall, the combination of a flow generator, a pressure generator for increasing the pressure of the untreated liquid in said heat transfer apparatus, liquid transmission means interconnecting said pressure generator, flow generator, and the opposite sides of said heat exchange wall in series flow relationship, means responsive to a predetermined amount of pressure of the treated liquid for placing in operation said pressure generator and increasing the output of said flow generator, and means for maintaining the pressure of the treated liquid at a level sufficient to sustain operation of said pressure generator while preventing excessive pressure in said apparatus.

6. In a pasteurizing system for liquid comestibles, the combination of a heat exchanger including a regenerative circuit in which the unpasteurized and pasteurized liquids flow in heat exchange relationship, flow generating means connected to said heat exchanger for generating flow of the liquid through said system, and means for increasing the efficiency of said system while maintaining the pasteurized liquid in said regenerative circuit at a higher pressure than the unpasteurized liquid, said last mentioned means comprising a booster pump having a discharge line connected to said heat exchanger for increasing the pressure of the unpasteurized liquid flowing in said regenerative circuit, pressure regulating means downstream from said regenerative circuit for controlling the pressure of the pasteurized liquid in said regenerative circuit, flow varying means operatively connected to said flow generating means for automatically increasing the liquid flow therefrom, pressure responsive means downstream from said regenerative circuit for starting said booster pump and flow varying means when a first pasteurized liquid pressure is reached that is higher than the maximum pressure generated by said booster pump, and means downstream from said regenerative circuit and responsive to a second and higher pasteurized liquid pressure to actuate said pressure regulating means and thereby maintain the pasteurized liquid at an operating pressure above said first pressure.

References Cited in the file of this patent

UNITED STATES PATENTS

| | | |
|---|---|---|
| 2,512,045 | Steinberg et al. | June 20, 1950 |
| 2,547,430 | Aldridge et al. | Apr. 3, 1951 |
| 2,651,996 | Nahmens | Sept. 15, 1953 |
| 2,724,337 | Teeson | Nov. 22, 1955 |